(12) United States Patent
Orr

(10) Patent No.: US 9,674,094 B1
(45) Date of Patent: Jun. 6, 2017

(54) METHOD AND APPARATUS FOR CONTROLLING TRANSMISSION OF PACKETS OVER A LINK AGGREGATION GROUP

(71) Applicant: MARVELL INTERNATIONAL LTD., Hamilton (BM)

(72) Inventor: Michael Orr, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 77 days.

(21) Appl. No.: 14/657,454

(22) Filed: Mar. 13, 2015

Related U.S. Application Data

(60) Provisional application No. 61/952,745, filed on Mar. 13, 2014.

(51) Int. Cl.
| | |
|---|---|
| *G06F 11/00* | (2006.01) |
| *H04J 1/16* | (2006.01) |
| *H04L 1/00* | (2006.01) |
| *H04L 12/26* | (2006.01) |
| *H04L 12/803* | (2013.01) |
| *H04L 12/891* | (2013.01) |
| *H04L 12/823* | (2013.01) |

(52) U.S. Cl.
CPC ............ *H04L 47/122* (2013.01); *H04L 47/32* (2013.01); *H04L 47/41* (2013.01)

(58) Field of Classification Search
CPC ........ H04L 47/122; H04L 47/32; H04L 47/41
USPC .... 370/254, 255, 256, 229, 230, 230.1, 231, 370/232, 233, 234, 235
See application file for complete search history.

(56) References Cited

U.S. PATENT DOCUMENTS

| | | | | |
|---|---|---|---|---|
| 2004/0081091 | A1* | 4/2004 | Widmer .............. | H04L 12/5693 370/230 |
| 2014/0211621 | A1* | 7/2014 | Sundaram .............. | H04L 47/41 370/231 |
| 2015/0172222 | A1* | 6/2015 | Liao ...................... | H04L 49/356 370/392 |
| 2016/0112305 | A1* | 4/2016 | Djekic ................... | H04L 12/54 370/235 |

* cited by examiner

*Primary Examiner* — Chuong T Ho

(57) ABSTRACT

Systems, methods, and other embodiments associated with controlling transmission of packets over a link aggregation group (LAG) using policies arranged in a tree hierarchy are described. According to one embodiment, a device includes a decision logic configured to manage transmission of packets over a link aggregation group by individually evaluating the packets according to a plurality of policies arranged into a tree hierarchy. The link aggregation group includes a plurality of interfaces connected to a remote device. The decision logic is configured to select one of the plurality of interfaces of the link aggregation group for each of the packets by using the plurality of policies. A transmission logic configured to control transmission of each of the packets according to which interface of the link aggregation group is selected for each of the packets as a result of evaluating the packets using the plurality of policies.

20 Claims, 4 Drawing Sheets

METHOD AND APPARATUS FOR CONTROLLING TRANSMISSION OF PACKETS OVER A LINK AGGREGATION GROUP

CROSS REFERENCE TO RELATED APPLICATIONS

This patent disclosure claims the benefit of U.S. Provisional Application Ser. No. 61/952,745 filed on Mar. 13, 2014, which is hereby wholly incorporated by reference.

BACKGROUND

Load balancing refers to distributing a work load across available resources. In computer networking, load balancing is used, for example, to divide network traffic among redundant links. In general, load balancing in this context is limited to a single determination that is a function of a single attribute of a communication. However, using a single attribute of a communication for load balancing limits flexibility and control over traffic patterns. Thus, difficulties with precisely controlling traffic patterns may arise.

SUMMARY

In general, in one aspect this specification discloses an apparatus for controlling transmission of packets to a remote device. The apparatus includes a decision logic configured to select, for a packet, an interface from a plurality of interfaces that are configured as a link aggregation group. The decision logic is configured to select the interface from the link aggregation group by evaluating the packet over a series of nodes of a hierarchical decision tree. The series of nodes specify policies for selecting a path through the hierarchical decision tree. The hierarchical decision tree includes leaf nodes that each specify one interface of the link aggregation group. The apparatus includes a transmission logic configured to control transmission of the packet on the link aggregation group according to the interface of the link aggregation group selected by the decision logic.

In general, in another aspect, this specification discloses a method for controlling transmission of packets to a remote device. The method includes selecting, in a network switch, an interface of a link aggregation group to transmit a packet to the remote device. Selecting the interface of the link aggregation group includes evaluating the packet over a series of nodes of a hierarchical decision tree. The series of nodes specify policies for selecting a path through the hierarchical decision tree. The hierarchical decision tree includes leaf nodes that each specify one interface of the link aggregation group. The method includes transmitting the packet using the interface of the link aggregation group selected as a result of evaluating the packet using the hierarchical decision tree.

In general, in another aspect, this specification discloses a device. The device includes a decision logic configured to manage transmission of packets over a link aggregation group by individually evaluating the packets according to a plurality of policies arranged into a tree hierarchy. The link aggregation group includes a plurality of interfaces connected to a remote device. The decision logic is configured to select one of the plurality of interfaces of the link aggregation group for each of the packets by using the plurality of policies. A transmission logic configured to control transmission of each of the packets according to which interface of the link aggregation group is selected for each of the packets as a result of evaluating the packets using the plurality of policies.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods and other embodiments associated with controlling transmission of packets over a link aggregation group (LAG) using policies arranged in a tree hierarchy. A LAG refers to a logical grouping of interfaces in a networking device that are connected to one or more remote devices. Thus, the interfaces of the LAG are redundant connections between the networking device and the one or more remote devices. In general, the LAG is created to provide a connection to the one or more remote devices with a higher bandwidth than can be provided by a single connection, and to provide a measure of fault-tolerance, by having the ability to shift traffic from a failing LAG component interface to another one.

Packets received in the network device that are destined for the remote device are provided/transmitted over the LAG. However, because the LAG includes multiple interfaces, the network device selects one of the interfaces for transmitting separate packets. Thus, in one embodiment, packets are evaluated according to a series of policies to determine which interface of the LAG will carry each separate packet. In this way, the network device can load balance packets between interfaces of the LAG and also perform other actions on the packets such as shaping, policing and so on.

Furthermore, in one embodiment, the present system arranges the policies into a hierarchical tree structure and defines policies at each node in the tree. Accordingly, the networking device evaluates each packet by traversing nodes and policies associated with the nodes through the hierarchical tree. In general, a result at each node controls which subsequent child node is selected next to evaluate a packet or other condition (e.g., current network load, unrelated administrative condition etc.) according to a policy of that subsequent selected node. Thus, the network device evaluates each packet along a different path that is unique to attributes of a given packet. In this way, a complex analysis of the packet is performed to select one of the interfaces of the LAG in an intelligent manner while also shaping and policing the packet.

Figure 1:
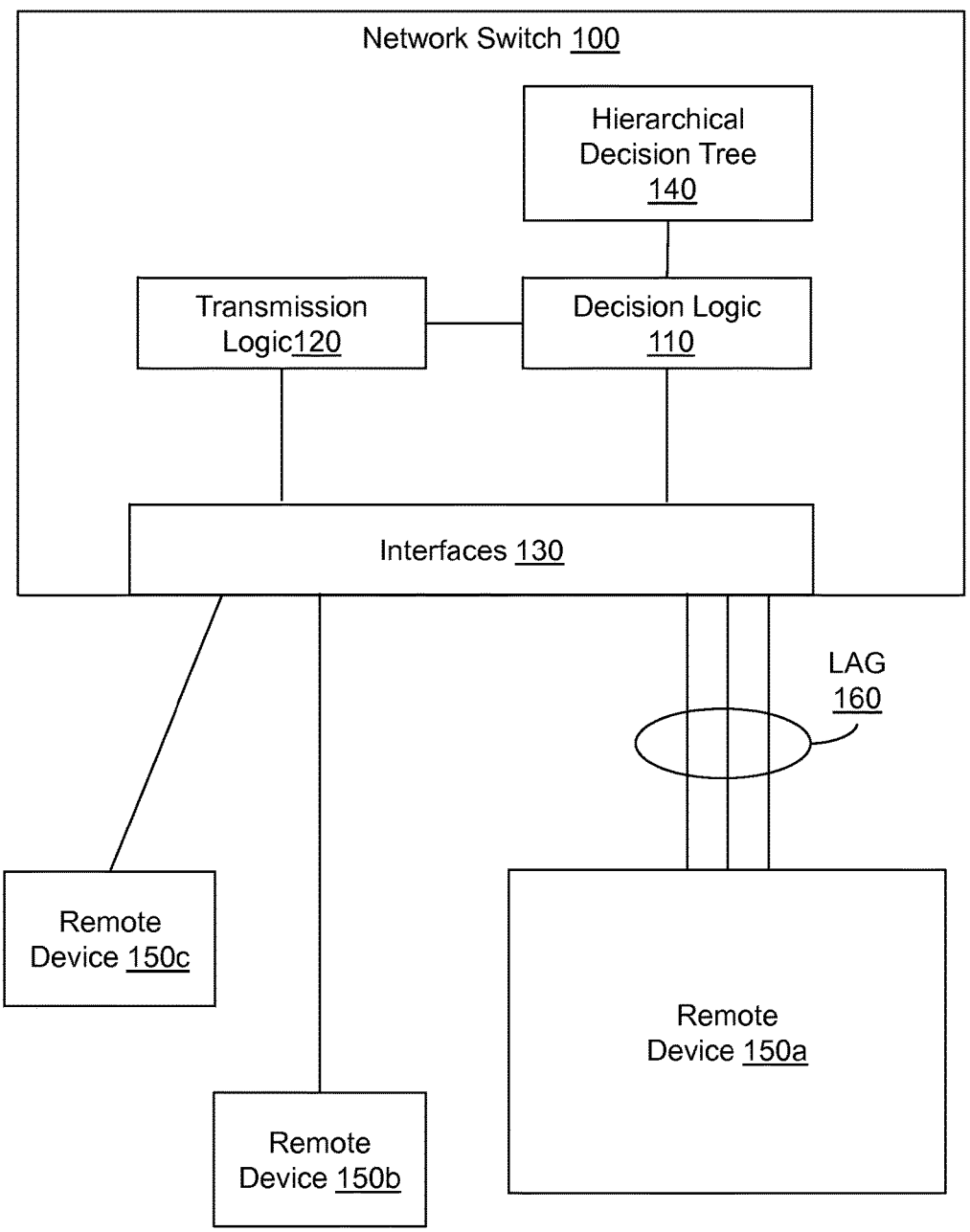
FIG. 1 illustrates one embodiment of an apparatus associated with using a hierarchical decision tree to select between multiple interfaces for transmitting a packet.

With reference to FIG. 1, one embodiment of a network switch 100 associated with using hierarchical policies for managing packets provided over a link aggregation group (LAG) is illustrated. In one embodiment, the network switch 100 includes a decision logic 110, a transmission logic 120 and multiple interfaces 130. In general, the decision logic 110 evaluates conditions and packets that are to be provided over the LAG according to a hierarchical decision tree 140. The transmission logic 120 controls the interfaces 130 to transmit packets according to instructions provided by the decision logic 110. Additionally, while the decision logic 110 and the tree 140 are illustrated as separate components, it should be appreciated that these components could be implemented as a single logic. In one embodiment, the decision logic 110 and the transmission logic 120 are implemented as modules of program instructions stored in a memory (e.g., a register, Random Access Memory (RAM), etc.). Further, while the transmission logic 120 and the interfaces are illustrated separately, in one embodiment, each separate one of the interfaces 130 may include a logic component that operates in a similar as the transmission logic 120. While the network switch 100 is discussed herein as implementing the decision logic 110 and the hierarchical decision tree 140, in other embodiments, the network switch 100 may be a router, bridge or other networking device.

For example, the network switch 100 is communicatively connected to multiple other devices (e.g., remote devices 150a, 150b and 150c) via the interfaces 130. The remote devices 150a-c may include network infrastructure devices (i.e., routers, switches, etc.), network bridges, servers, personal computers, wireless access points and so on. In general, the interfaces 130 both send and receive packets to and from the remote devices 150a-c. Furthermore, in one embodiment, the interfaces 130 are network interface cards (NICs), ports or similar devices that accept a physical cable (connect via a cable port) or otherwise interact with a communications media. The physical cable may be a fiber optic cable, an Ethernet cable or some similar communications cable. In either case, each of the interfaces 130 may communicate with a different remote device or a multiple number of the interfaces 130 may be connected to a single device (e.g., the remote device 150a).

Multiple connections between the network switch 100 and the remote device 150a may be desired to increase an overall available bandwidth. By combining single links that may communicate individually at a first bandwidth (e.g., 100 MB/s) into a group, a higher second bandwidth (e.g., N times 100 MB/s) for communications is achieved between the network switch 100 and the remote device 150a. Furthermore, in one embodiment, a link aggregation group (LAG) 160 includes connections between the network switch 100 and multiple remote devices in addition to the remote device 150a. That is, for example, the network switch 100 may connect through the LAG 160 with the remote device 150a in addition to one or more other remote devices (not shown). Thus, the LAG 160 may be comprised of multiple connections to the remote device 160, multiple connections to a second remote device, and so on. In this way, the network switch 100 can connect through the LAG 160 to multiple other devices.

However, in the example of FIG. 1, three of the interfaces 130 are connected to the remote device 150a represented by the three (3) lines connected to the remote device 150a. Of course, any number of interfaces may be grouped and connected to a remote device. The three interfaces are combined into the link aggregation group (LAG) 160. In general, grouping the three interfaces into an LAG instead of just providing redundant connections is done to avoid difficulties with network functionality. For example, without configuring the interfaces into an LAG, difficulties such as broadcast storms may arise from packets being iteratively duplicated back onto the redundant interfaces.

Thus, in one embodiment, the network switch 100 and the remote device 150a configure the LAG 160 according to a negotiation of parameters and attributes about the LAG 160. The negotiation may conform to a link aggregation control protocol (LACP) or a similar protocol standard for configuring LAGs between devices. Once the LAG 160 is formed, packets received in the network switch 100 that are destined for the remote device 150a are transmitted over the LAG 160.

However, while the LAG 160 carries traffic between the network switch 100 and the remote device 150a, the traffic is not, for example, just provided to interfaces of the LAG 160. This is because it is generally desirable to load balance the traffic in a substantially equal manner among the interfaces of the LAG 160. In general, load balancing the traffic may include balancing according to a number of packets, to a size of packets and so on. Accordingly, in one embodiment, the decision logic 110 selects one of the interfaces of the LAG 160 for each packet.

In one embodiment, the decision logic 110 is configured to select an interface of the LAG 160 for a packet according to attributes of the packet. For example, the decision logic 110 may hash an IP address of each packet to select which of the interfaces of the LAG 160 will carry a packet. However, using just a single policy such as hashing an IP address may encounter difficulties when, for example, a result of the hash over burdens one or more of the interfaces of the LAG 160.

Consider that circumstances may arise where a majority of traffic destined for the remote device 150a originates from a single source device or a single network. Thus, using the originating IP address of a packet, in this example, results in one of the interfaces of the LAG 160 being selected disproportionately because a majority of the packets have the same originating IP address and thus produce the same hash result.

Accordingly, in one embodiment, the decision logic 110 uses the hierarchical decision tree 140 to select which of the multiple interfaces 160 will carry each separate packet. The hierarchical decision tree 140 is, for example, a data structure that defines a set of linked nodes such as in a tree or graph data structure. One example is discussed with reference to FIG. 2. In general, each node in the hierarchical decision tree 140 includes a separate policy and each node also links to a number of subsequent nodes depending on a number of possible results of a policy in the node.

Each policy defines, for example, a metric for evaluating packets. Thus, the policies may include hashing a particular attribute (e.g., MAC or IP address), comparing attributes, measuring attributes (e.g., payload size), and so on. While the policies are generally discussed as defining metrics according to attributes of the packets, in one embodiment, the policies also define metrics that are unrelated to the packets. That is, one or more of the policies defined in the hierarchical decision tree 140 may specify policies that select a subsequent node according to a random number, network conditions, administrative conditions (e.g., time of day) and more generally, any condition unrelated to the packet that may be used to select a subsequent node. The network conditions may specify selecting a subsequent node according to conditions on a downlink (e.g., load of a downstream/remote device), according to an "emptiest" queue to reduce time until transmission, and so on.

Furthermore, while the hierarchical decision tree 140 is used to select one of the interfaces of the LAG 160, in one embodiment, the hierarchical decision tree 140 can also be populated with policies for shaping packets, marking packets, dropping packets and performing other actions for processing packets in addition to selecting interfaces of the LAG 160. Thus, along with policies at various nodes, the hierarchical decision tree 140 may include queues at various nodes for shaping packets (e.g., traffic shaping/management). Additionally, the policies may specify actions such as modifying an address in the packet for forwarding and so on.

While the decision logic 110 is configured to use the hierarchical decision tree 140 to manage packets, the network switch 100 configures the LAG 160 independently of the hierarchical decision tree 140. That is, network switch 100 forms and establishes the connections of the LAG 160 with the remote device 150a according to an LAG protocol (e.g., link aggregation control protocol (LACP)) without notifying or otherwise requiring any changes on the part of the remote device 150a to accommodate using the hierarchical decision tree 140. Thus, using the hierarchical decision tree 140 to evaluate and manage traffic over the LAG 160 is legacy compliant.

Figure 2:
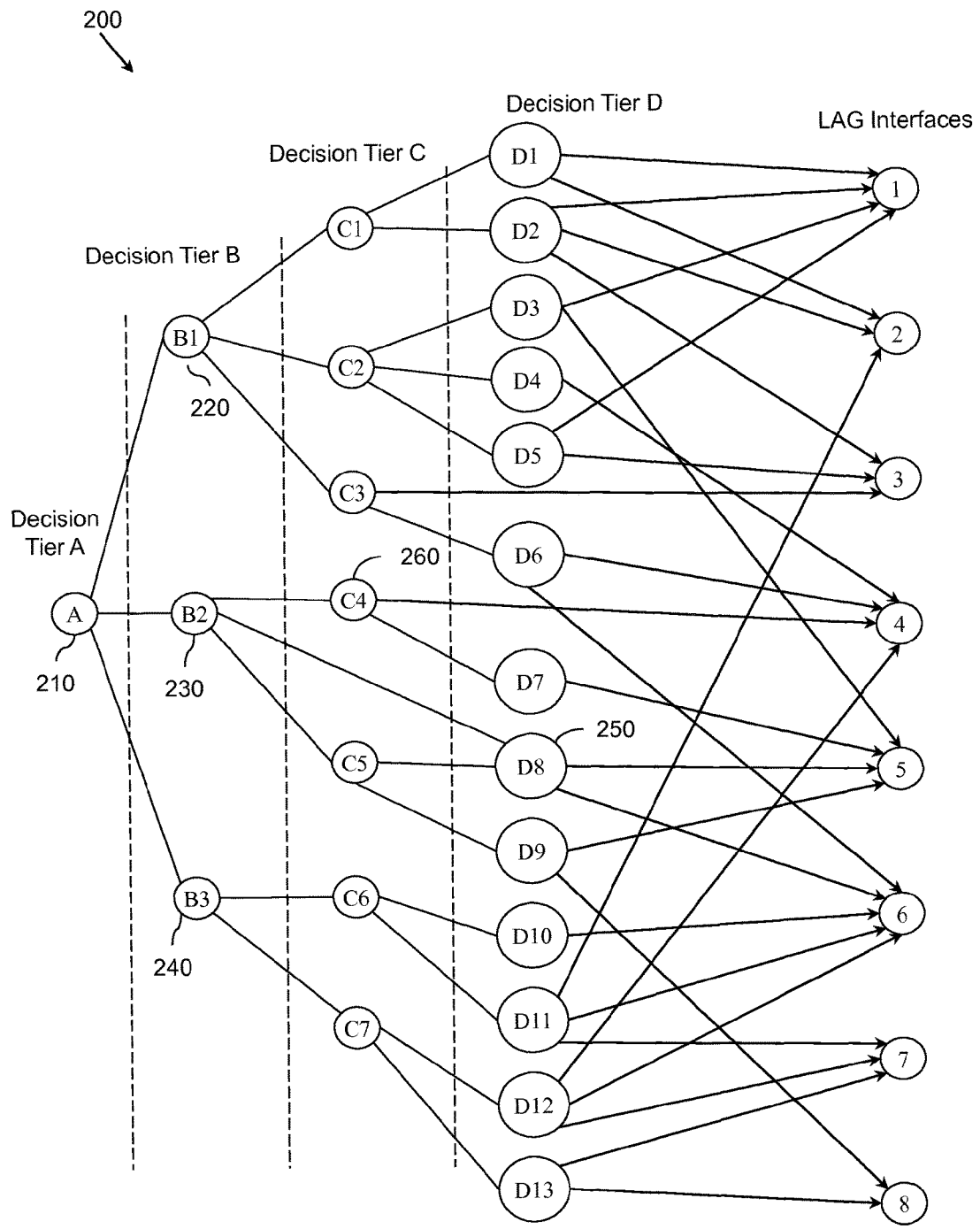
FIG. 2 illustrates one embodiment of hierarchical decision tree.

FIG. 2 illustrates one embodiment of a hierarchical decision tree 200 that is used to describe an example of the hierarchical decision tree 140 of FIG. 1. The decision tree 200 will be discussed along with elements of FIG. 1. Overall, for a packet, the hierarchical decision tree 200 is implemented to select a particular interface from the group of interfaces (e.g., LAG interfaces 1-8). The interface selection is decided based on attributes/properties of the packet being processed by one or more policy rules defined at each node in the tree 200. The result at each node causes the tree 200 to be traversed along a path leading to a leaf node that specifies an LAG interface. The packet is then transmitted using the specified interface.

With reference to FIG. 2, the tree 200 includes four separate tiers A, B, C and D of decisions. The tree 200 may include greater or fewer tiers depending on a particular implementation. An entry point of the tree 200 is a root/parent node 210. The root node 210 defines the decision tier A. While only a single parent node is illustrated in the tree 200, of course, in other embodiments the tree 200 may have more than a single entry point with the separate entry points being specific to, for example, different types of packets.

In the example, the parent node 210 has three child nodes in tier B. This is because a policy defined for the parent node 210 has three separate possible results for evaluating a packet. Each result at the parent node 210 is associated with a link to a different one of child nodes 220, 230 and 240 in tier B. The parent node 210 may also have a fourth possible result that is to drop the packet, i.e., delete the packet, and thus a child node is not necessary for this result.

Consider an example evaluation of a packet at node 210. The decision logic 110 of FIG. 1 evaluates a packet at the parent node 210 according to a policy of the parent node 210. The policy may indicate to hash an attribute of the packet (e.g., MAC address, last 3 digits of a particular header field, etc.) or perform some other comparison. In either case, evaluating the packet according to the policy of the node 210 has three possible outcomes/results. The result at node 210 dictates to which of the child nodes 220, 230 and 240 the decision logic 110 traverses for further evaluating the packet. The decision logic 110 evaluates the packet in a likewise manner at each subsequent node as the tree 200 is traversed.

Each of the child nodes 220, 230 and 240 includes a separate policy for evaluating the packet. Similarly, each subsequent child node in tier C and tier D also have separate policies for evaluating and/or managing (e.g., shaping) the packet. However, depending on a result at each tier, generally only a single node in each tier will be traversed. Thus, the decision logic 110 will generally evaluate the packet according to one separate policy at each tier which follows a path or series of nodes from the parent node to a terminal/leaf node at tier D which evaluates the packet to finally select an interface of the LAG.

In either case, policies at subsequent nodes while possibly not related according to subject matter are related according to their basic association as a child node of a previous node. That is, the basic inherent format of the tree 200 dictates that each subsequent node is related to a previous node to which it is connected.

Returning to the nodes 220, 230 and 240, consider the links between tier B nodes and tier C nodes. The tree 200 illustrates how each node may be configured to connect with a different number of child nodes according to results of a policy at each node. Additionally, the tree 200 also illustrates how a tier may be skipped for a particular result of a policy at one node and how the tree 200 is generally flexible to be configured in whichever way is best suited for a particular implementation and different policies at each node.

For example, the node 230 links with three child nodes that are each associated with a different result of a policy at the node 230. However, node 250 is in tier D instead of tier C. Thus, one result of the policy at node 230 skips tier C. Furthermore, node 260 includes one policy result that skips tier D and instead leads to an immediate selection of an interface for the packet (interface 4). Thus, depending on the policy and a result at each node, many different options are possible for managing the packet and selecting an interface of the LAG 160. In one embodiment, policies at each tier A-D are tuned to perform load balancing according to a particular load balancing algorithm. That is, policies at each child node along a tree path are tuned to help ensure an even distribution of traffic among the interfaces 1-8.

Additionally, while eight interfaces are shown to select from in the tree 200, in other embodiments, the tree 200 may provide for selecting between a fewer number of interfaces (e.g., 3 as in FIG. 1) or a greater number of interfaces (e.g., 64, 128, etc.). The tree 200 illustrates many of the nodes in the final tier D as linking to LAG interfaces that may also be linked to by some other nodes. While this configuration is one possibility, in other embodiments, each node in the final tier D may also uniquely link to a specific set of LAG interfaces.

Furthermore, while the tree 200 is generally discussed as providing a hierarchy of policies for selecting which of the interfaces of the LAG 160 will carry a particular packet, the tree 200 can include policies for traffic management. Thus, in one embodiment, the decision logic 110 is configured to modify, queue, drop or perform other traffic management functions (e.g., quality of service) on a packet according to a policy of a particular node. In this way, the network switch 100 can combine load balancing and traffic management functions into the single hierarchical decision tree 140.

Figure 3:
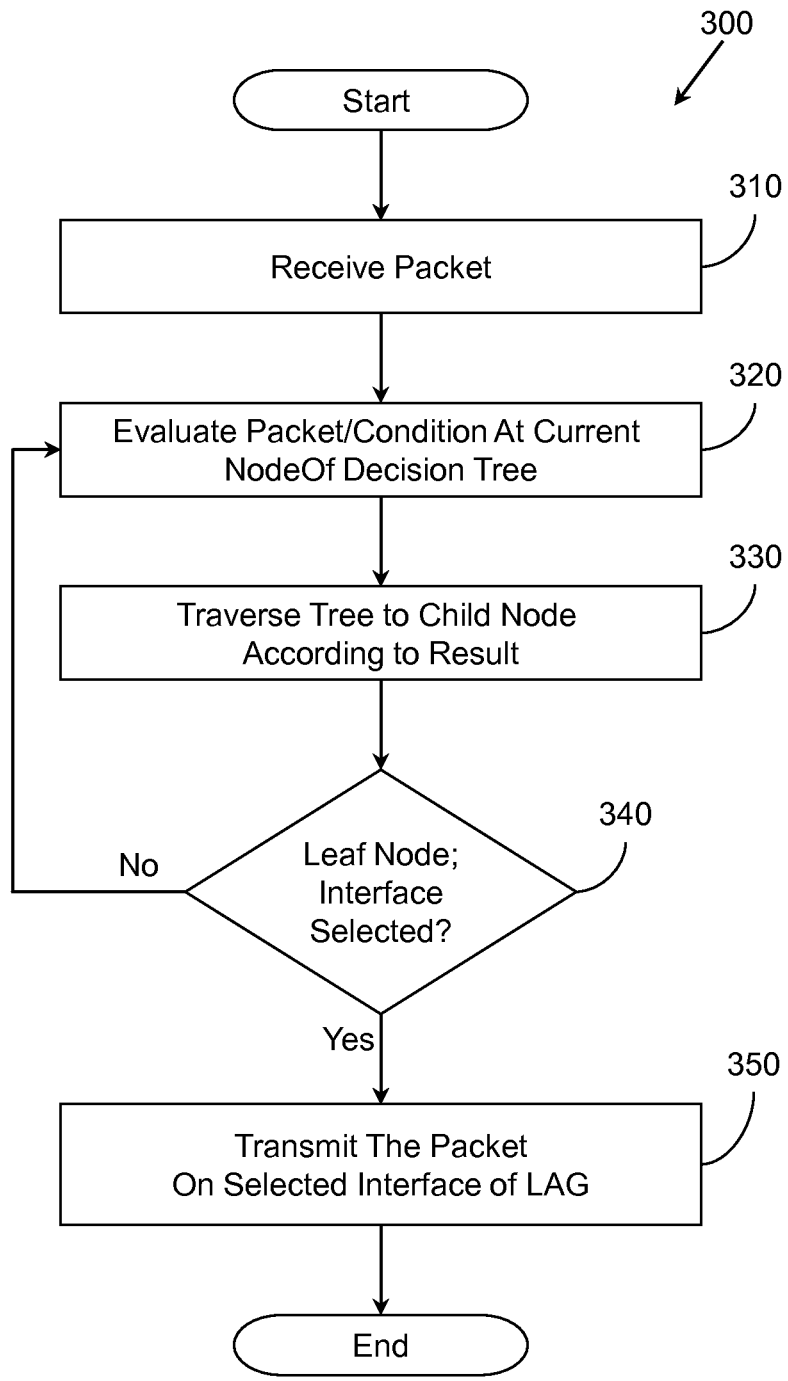
FIG. 3 illustrates one embodiment of a method for controlling transmission of packets over a logical aggregation group (LAG).

With reference to FIG. 3, one embodiment of a method 300 associated with controlling transmission of network traffic over an LAG is illustrated. In one embodiment, method 300 is implemented and performed by the network switch 100 and decision logic 110 of FIG. 1. Method 300 describes using the hierarchical decision tree 140 to manage network traffic over a link aggregation group (LAG) as previously discussed. As used within the following discussion, the LAG is referenced as including a set of interfaces or more generally multiple interfaces. Thus, the LAG generally includes at least two interfaces. The interfaces of the LAG are redundant communications links with a single remote device and have been configured and grouped into the LAG.

At 310, packets are received in a device. In one embodiment, the device is a network device such as a network switch, router, bridge or, more generally, any networking device that receives packets and communicates with a remote device using an LAG. The packets are, for example, electronic communications received from a physical communication link or a wireless communication link. In general, while the device may receive packets from many sources that are destined for many separate destinations, the packets that will be discussed throughout method 300 are packets received in the device that are destined for the remote device 150*a* over the LAG 160 (as seen in FIG. 1).

Blocks 320, 330 and 340 of method 300 generally describe determining which interface of the LAG on which to provide a packet. However, while the discussion is generally focused on selecting an interface, additional traffic management functions will be discussed along with selecting the interface.

Accordingly, at 320, a packet is evaluated at a current node of a hierarchical decision tree. As previously discussed in relation to FIG. 2, the hierarchical decision tree is an ordered structure of nodes with each node including at least one policy. The policies define conditions for evaluating packets and may also define actions to be performed on a packet. In general, a policy defined for each node in the hierarchical decision tree includes conditions or rules that are applied to one or more attributes from the packet to produce a result. In another embodiment, the policy may define a rule that is unrelated to attributes of the packet or in any way to the packet. That is, the policy may define a rule that specifies that a decision can depend on Time-of-day, making different decisions for traffic passed during business hours than weekends, or different decisions at financial-quarter-end and so on. In general, the policies are configurable to apply to a specific implementation.

The result causes the tree traversal path to select a subsequent node in the hierarchical decision tree. When the current node is a leaf node in the tree, then the policy of the leaf node specifies conditions for selecting one of the interfaces linked to the particular node.

In general, evaluating a packet may include many different actions. For example, evaluating the packet may include parsing a packet header to identify attributes of the packet specified by a policy and then using those attributes as input to a function. The specified function may be a hash function, a category determination (e.g., quality of service or priority of service), a function for comparing attributes, or other function for generating a result value from the attribute of the packet. In some embodiments, the function is a traffic management function such as shaping the packet, marking the packet and/or dropping the packet. In this example, evaluating the packet according to the policy may include queuing the packet or otherwise modifying how the packet is further communicated.

In either case, a result of the function specifies how to traverse the hierarchical tree. That is, the function provides, for example, one of X separate results with each of the X separate results associated with a different child node of the current node.

Accordingly, at 330, the tree is traversed according to the result of evaluating the packet at 320. According to the result of evaluating the packet, at 320, a child node in the tree is selected for a subsequent evaluation. Thus, traversing the tree at 330 leads to a child node for additional evaluation or to a leaf node that specifies a selected interface of the LAG that is to transmit the packet.

Therefore, at 340, if the traversal from 330 leads to a child node that is not a leaf node, then the packet is evaluated according to a policy of the child node at 320 and the blocks 320, 330, and 340 repeat. However, if the traversal at 330 leads to a leaf node with a specified interface of the LAG, then the method selects the interface specified in the leaf node. Then the packet is transmitted on the selected interface at 350. In this way, the packet is iteratively evaluated over a series of nodes until reaching a terminal node of the tree that identifies an interface on which the packet is to be transmitted. Method 300 is repeated for other packets.

Figure 4:
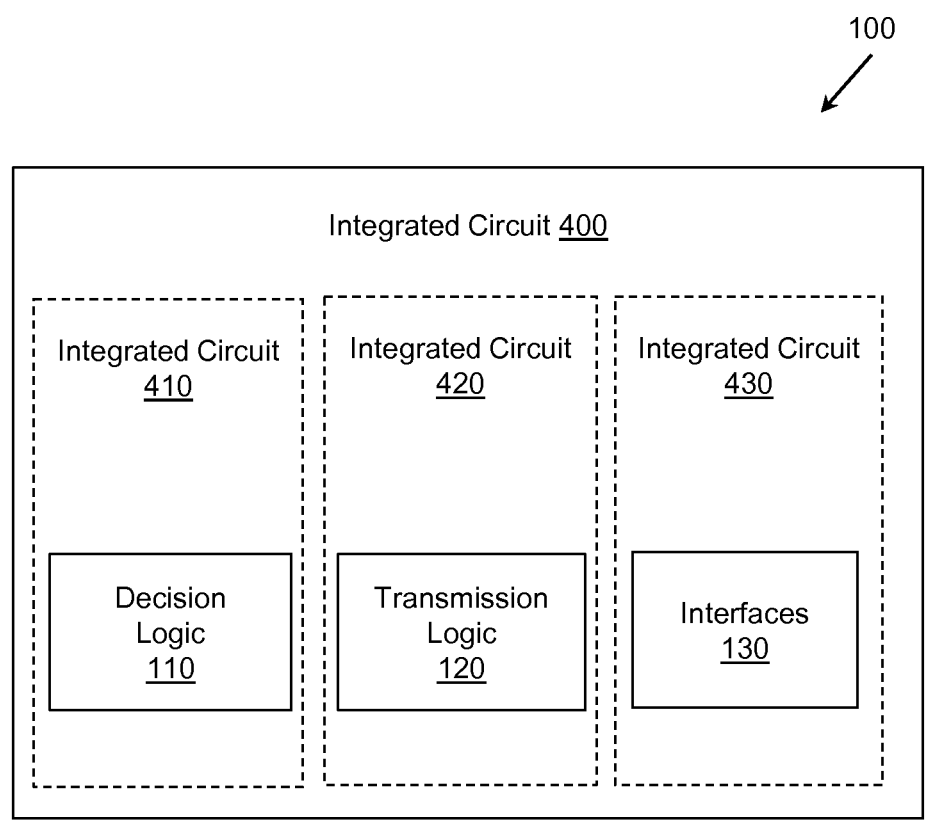
FIG. 4 illustrates one embodiment of a device associated with evaluating packets for transmission according to a hierarchical decision tree.

FIG. 4 illustrates another embodiment of the network switch 100 from FIG. 1 that is configured with separate integrated circuits and/or chips. In this embodiment, the decision logic 110 from FIG. 1 is embodied as a separate integrated circuit 410. Additionally, the transmission logic 120 is embodied on an individual integrated circuit 420 and the interfaces 130 are embodied on an individual integrated circuit 430. The circuits are connected via connection paths to communicate signals. While integrated circuits 410, 420 and 430 are illustrated as separate integrated circuits, they may be integrated into a common circuit board 400. Additionally, integrated circuits 410, 420 and 430 may be combined into fewer integrated circuits or divided into more integrated circuits than illustrated. Additionally, in another embodiment, the decision logic 110, the transmission logic 120 and the interfaces 130 illustrated in integrated circuits 410, 420 and 430 may be combined into a separate application specific integrated circuit.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data.

Computer storage media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus for controlling transmission of packets to a remote device, the apparatus comprising:
   a decision logic implemented in a hardware processor, wherein the decision logic is configured to select, for a packet, an interface from a plurality of interfaces that are configured as a link aggregation group, wherein the decision logic is further configured to select the interface from the link aggregation group by evaluating the packet in accordance with a hierarchical decision tree that includes (i) one or more tiers of child nodes and (ii) a plurality of leaf nodes, wherein each child node of the tiers of child nodes specifies a policy for selecting a path through the hierarchical decision tree, and wherein each leaf node of the plurality of leaf nodes of the hierarchical decision tree respectively specifies one interface from the plurality of interfaces of the link aggregation group; and
   a transmission logic implemented with a hardware network interface and configured to control transmission of the packet via the hardware network interface to the link aggregation group according to the interface of the link aggregation group selected by the decision logic.

2. The apparatus of claim 1, wherein the decision logic is configured to traverse the hierarchical decision tree according to a policy specified for a particular node, and wherein the decision logic is configured to select a subsequent child node in the tiers of child nodes according to a result of evaluating the packet at a current node in the tiers of child nodes.

3. The apparatus of claim 1, wherein each node of the hierarchical decision tree defines a policy for managing the packet, and wherein the decision logic is configured to manage the packet by shaping, marking or dropping the packet.

4. The apparatus of claim 1, wherein:
   the plurality of interfaces are network communication interfaces configured to receive and transmit packets, wherein at least two interfaces of the plurality of interfaces are grouped together to form the link aggregation group, wherein each of the at least two interfaces is separately connected to the remote device to provide communications between the apparatus and remote device.

5. The apparatus of claim 1, wherein a policy defined for each child node in the hierarchical decision tree defines one or more actions for managing the packet, wherein the one or more actions include shaping the packet, dropping the packet, policing the packet, modifying the packet, selecting an interface of the link aggregation group for the packet according to specified attributes of the packet, and selecting a subsequent node in the hierarchical decision tree for the packet according to specified attributes of the packet,
   wherein the hierarchical decision tree is a graph data structure with a root node as an entry point and each subsequent tier of the tiers of child nodes having at least one child node, and wherein the hierarchical decision tree terminates with a final tier as the plurality of leaf nodes wherein each leaf node specifies one or more interfaces from the plurality of interfaces of the link aggregation group.

6. The apparatus of claim 1, wherein the decision logic is configured to evaluate the packet by (i) parsing the packet to identify attributes specified by a policy of a current node of the hierarchical decision tree and (ii) comparing the attributes according to a specified function to determine a result for the current node.

7. The apparatus of claim 1, wherein the apparatus is a network switch, and wherein the link aggregation group is a logical grouping of interfaces within which each of the interfaces maintains a communication link to the remote device.

8. A method for controlling transmission of packets to a remote device, the method comprising:
   selecting, in a network switch, an interface from a plurality of interfaces that are configured as a link aggregation group to transmit a packet to the remote device, wherein selecting the interface of the link aggregation group includes evaluating the packet in accordance with a hierarchical decision tree that includes (i) one or more tiers of child nodes and (ii) a plurality of leaf nodes, wherein each child node of the tiers of child nodes specifies a policy for selecting a path through the hierarchical decision tree and wherein each leaf node of the plurality of leaf nodes of the hierarchical decision tree respectively specifies one interface from the plurality of interfaces of the link aggregation group; and
   transmitting the packet using the interface of the link aggregation group selected as a result of evaluating the packet using the hierarchical decision tree.

9. The method of claim 8, wherein each node in the hierarchical decision tree specifies a policy for evaluating the packet, wherein selecting the interface of the link aggregation group includes traversing the hierarchical decision tree according to a result at each child node for the packet and includes evaluating attributes of the packet according to the policy specified for a particular child node, and wherein evaluating the packet over the one or more tiers of child nodes includes selecting a subsequent child node in the one or more tiers of child nodes according to a result of evaluating the packet at a current child node in the one or more tiers of nodes.

10. The method of claim 8, wherein traversing the hierarchical decision tree includes determining each subsequent child node in the one or more tiers of child nodes according to a result from evaluating the packet at a current child node in the one or more tiers of child nodes.

11. The method of claim 8, further comprising:
   receiving, in the network switch, electronic communications including the packet, wherein the link aggregation group includes at least two interfaces, wherein each of the at least two interfaces is separately connected to the remote device to provide communications between the network switch and the remote device.

12. The method of claim 8, wherein each policy defined in the hierarchical decision tree includes one or more actions for evaluating and managing the packet, wherein the one or more actions include shaping the packet, dropping the packet, policing the packet, modifying the packet, selecting an interface of the link aggregation group according to attributes of the packet, and selecting a subsequent node in the hierarchical decision tree according to attributes of the packet,
   wherein the hierarchical decision tree is a graph data structure with a root node as an entry point and each subsequent tier of the tiers of child nodes having at least one child node, and wherein the hierarchical decision tree terminates with a final tier of child nodes as the plurality of leaf nodes.

13. The method of claim 8, wherein evaluating the packet includes (i) parsing the packet to identify attributes specified by a policy of a current node in the hierarchical decision tree and (ii) comparing the attributes according to a specified function to determine a result for the current node.

14. The method of claim 8, wherein the logical aggregation group is a logical grouping of the plurality of interfaces within which each of the interfaces maintains a communication link to one or more remote devices including the remote device.

15. A device comprising:
   a decision logic implemented in at least a hardware processor, wherein the decision logic is configured to manage transmission of packets over a link aggregation group by individually evaluating the packets in accordance with a tree hierarchy that includes one or more tiers of child nodes that terminate into a plurality of leaf nodes, wherein each child node of the tiers of child nodes specifies a policy for selecting a path through the tree hierarchy based at least on attributes of a packet being evaluated, and wherein each leaf node of the plurality of leaf nodes respectively specifies one interface from a plurality of interfaces of the link aggregation group, wherein the plurality of interfaces are communicatively connected to a remote device, and wherein the decision logic is configured to select one interface of the plurality of interfaces of the link aggregation group for each of the packets by traversing the tree hierarchy to one of the leaf nodes; and
   a transmission logic implemented with at least a hardware network interface and configured to control transmission of each of the packets via the hardware network interface according to which interface of the link aggregation group is selected for each of the packets as a result of evaluating the packets and traversing the tree hierarchy to one of the leaf nodes.

16. The device of claim 15, wherein the decision logic is configured to evaluate each of the packets according to policies of the plurality of policies that are linked through a series of nodes through the one or more tiers of child nodes of the tree hierarchy, and wherein the decision logic is configured to traverse the tree hierarchy for each of the packets according to a result of evaluating each packet at each of the series of nodes through the tree hierarchy.

17. The device of claim 15, wherein the decision logic is configured to select each subsequent child node and associated policy in the tree hierarchy according to a result of evaluating a packet according to a current policy at a current child node of the tree hierarchy, wherein the tree hierarchy is a graph data structure with a parent node as an entry point and each subsequent tier of the one or more tiers of child nodes having at least one child node, and wherein the tree hierarchy terminates with a final tier of child nodes that are the plurality of leaf nodes wherein each leaf node specifies one or more of the interfaces of the link aggregation group to select for transmission of the packet.

18. The device of claim 15, wherein the policies of one or more of the child nodes include policies for shaping and queuing packets, dropping packets, policing packets, modifying packets, selecting an interface of the link aggregation group on which to transmit a packet of the packets, and selecting a subsequent child node in the tree hierarchy.

19. The device of claim 15,
   wherein the plurality of interfaces includes a set of interfaces configured to receive and transmit the packets, wherein at least two interfaces of the set of interfaces are grouped together to form the link aggregation group, wherein each of the at least two interfaces is separately connected to the remote device to provide communications between the device and remote device.

20. The device of claim 15, wherein the device is a network switch, and wherein the link aggregation group is a logical grouping of the plurality of interfaces within which each of the plurality of interfaces maintains a communication link to the remote device.

\* \* \* \* \*